May 18, 1943. E. N. LIGHTFOOT 2,319,415
ELECTRICAL CONTROL APPARATUS
Filed Oct. 2, 1940 6 Sheets-Sheet 1
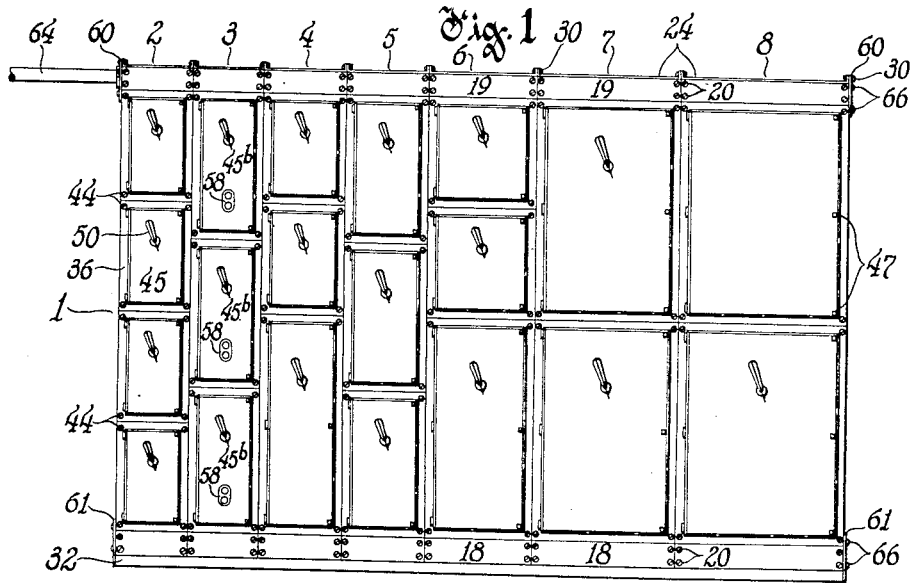
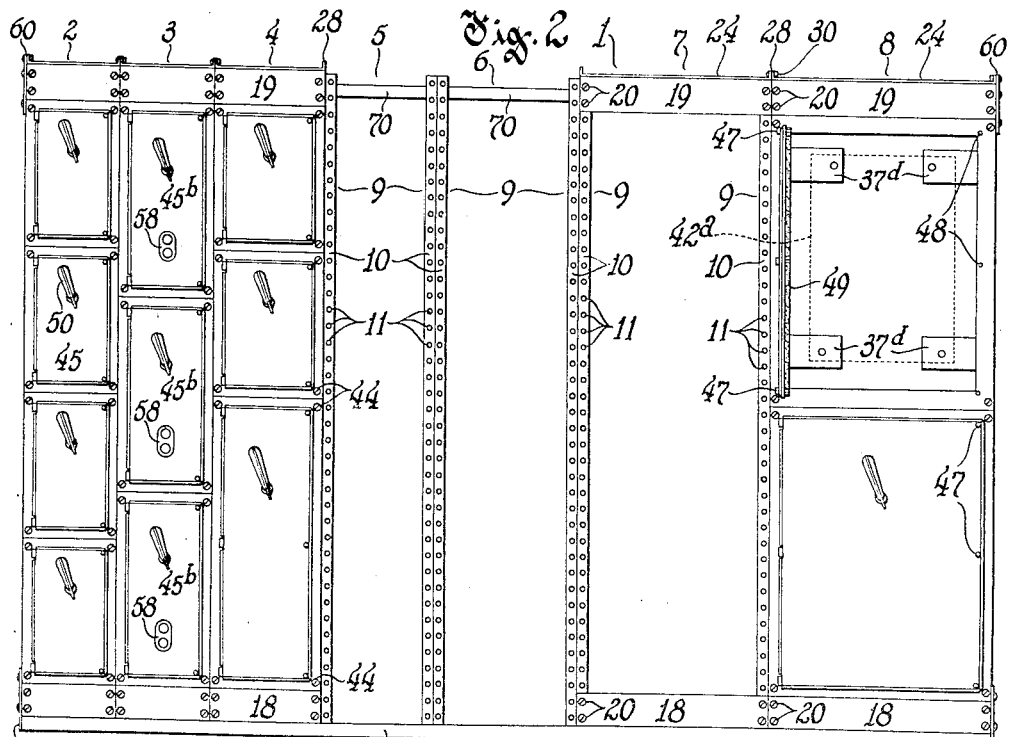

May 18, 1943.  E. N. LIGHTFOOT  2,319,415
ELECTRICAL CONTROL APPARATUS
Filed Oct. 2, 1940.  6 Sheets-Sheet 2
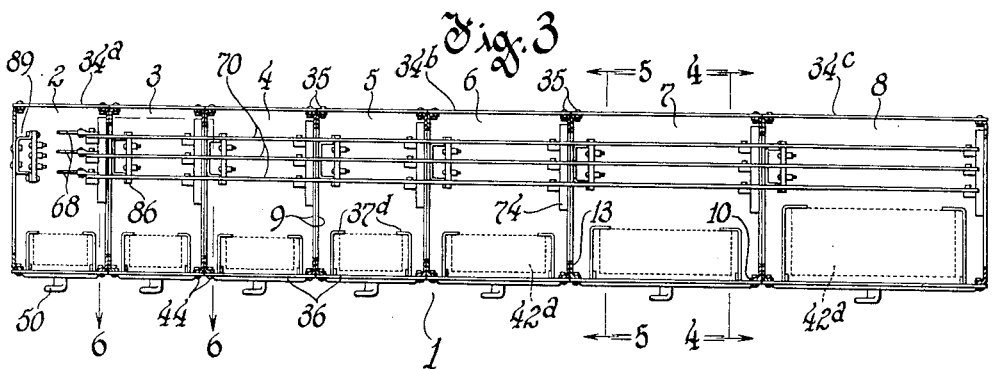
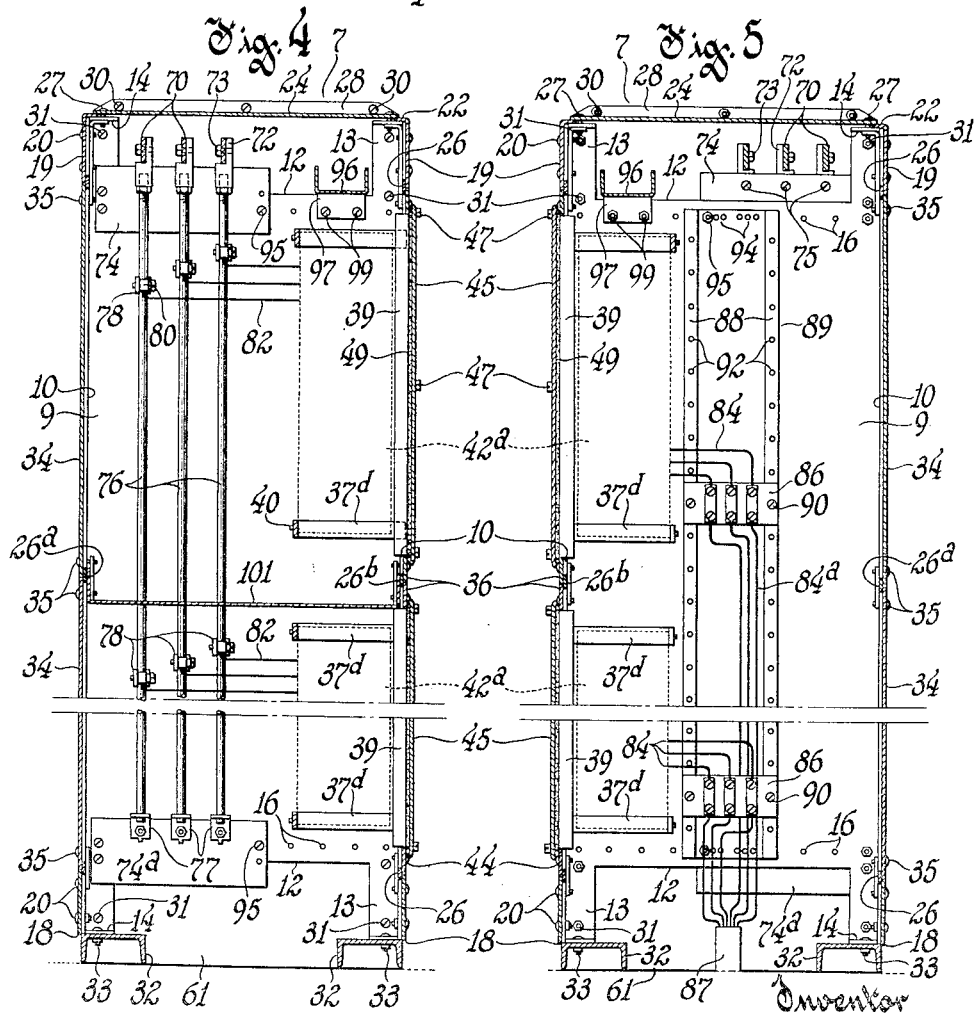

May 18, 1943  E. N. LIGHTFOOT  2,319,415
ELECTRICAL CONTROL APPARATUS
Filed Oct. 2, 1940  6 Sheets-Sheet 3
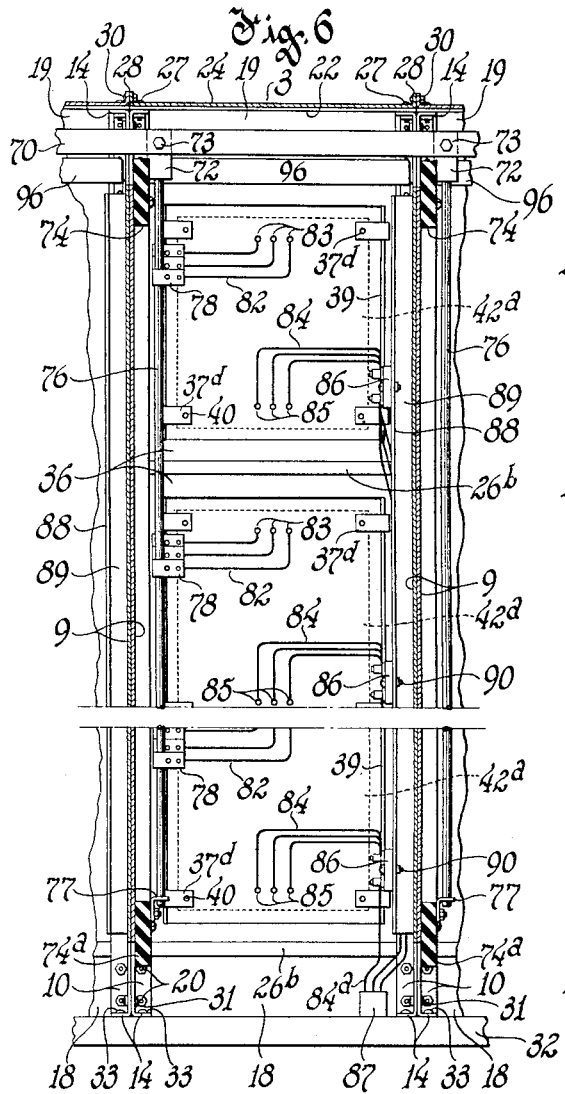
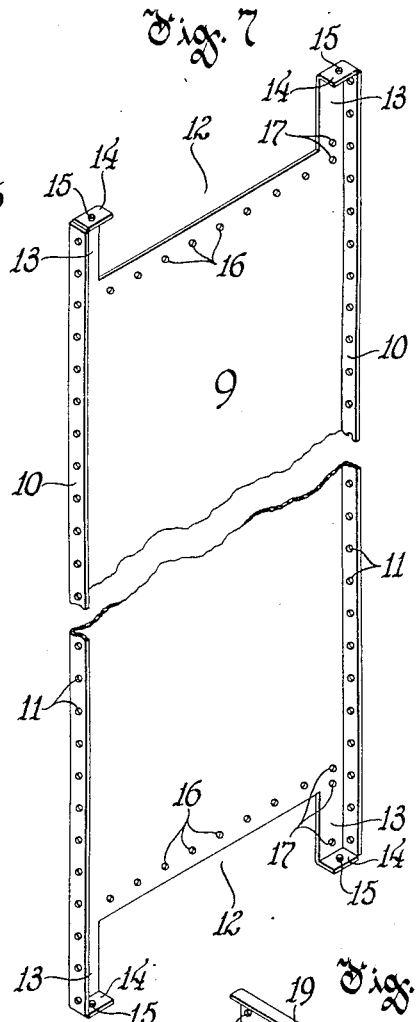
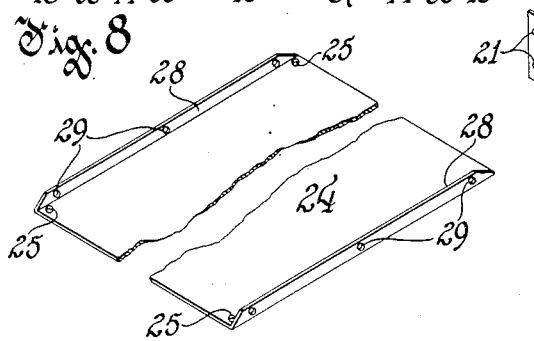
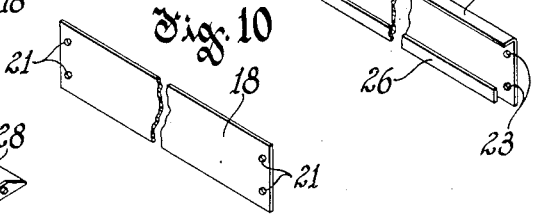
Inventor
Edwin N. Lightfoot
By
Attorney

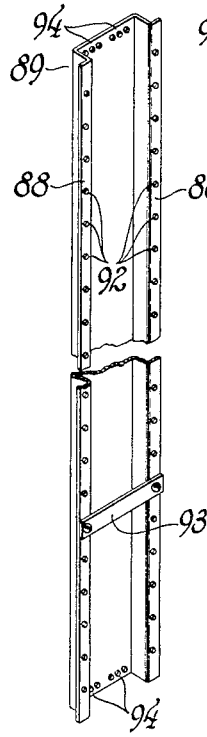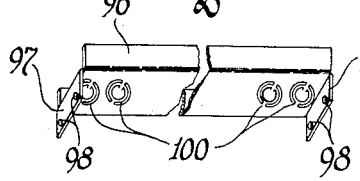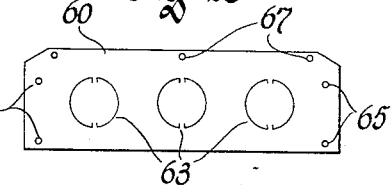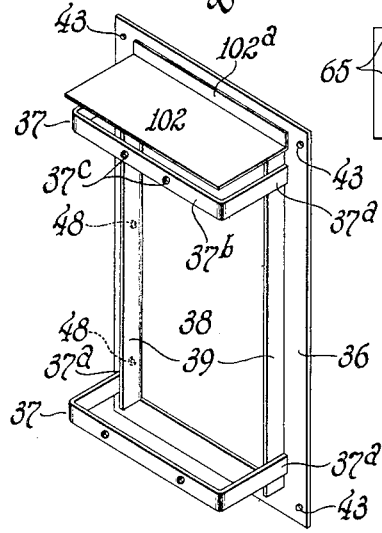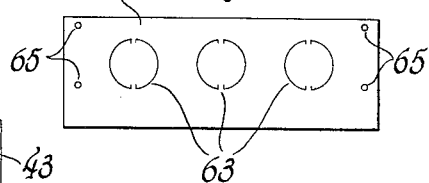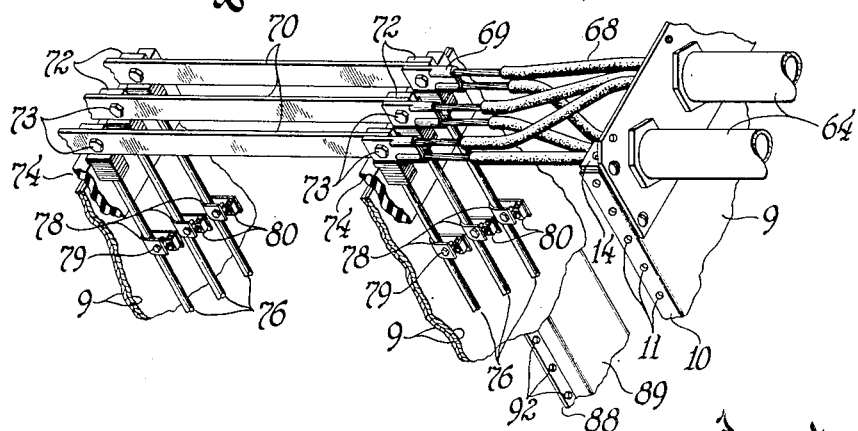

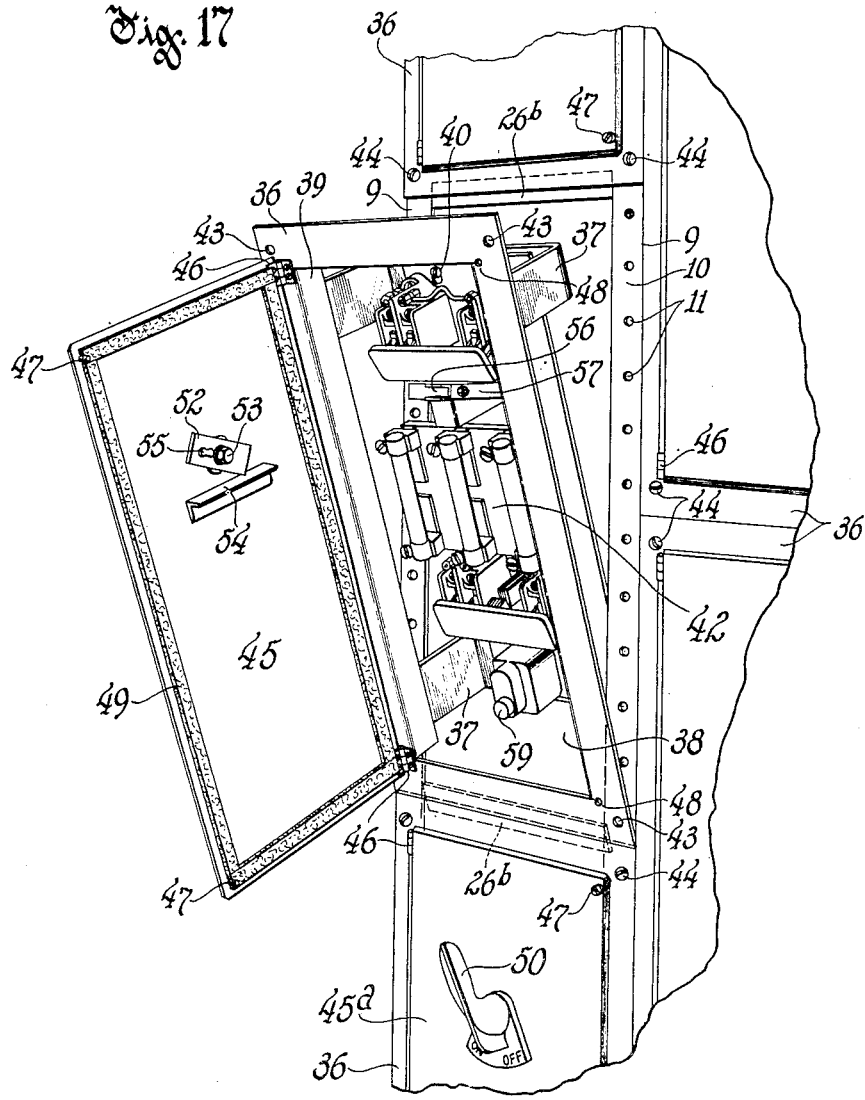

May 18, 1943. E. N. LIGHTFOOT 2,319,415
ELECTRICAL CONTROL APPARATUS
Filed Oct. 2, 1940 6 Sheets-Sheet 6
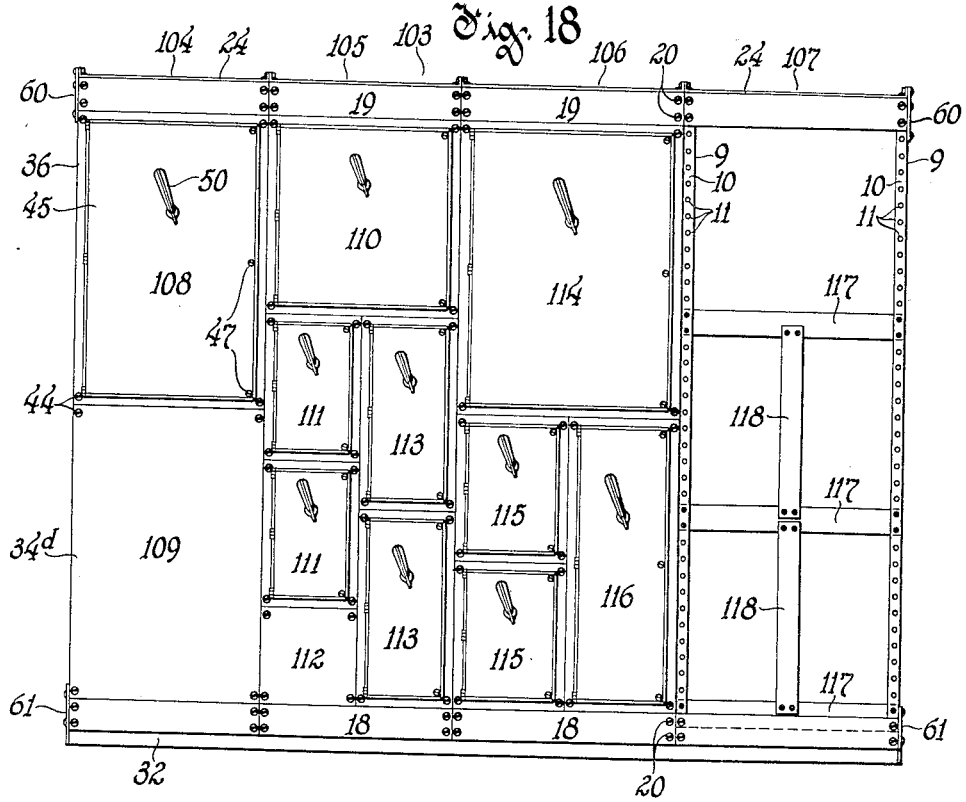
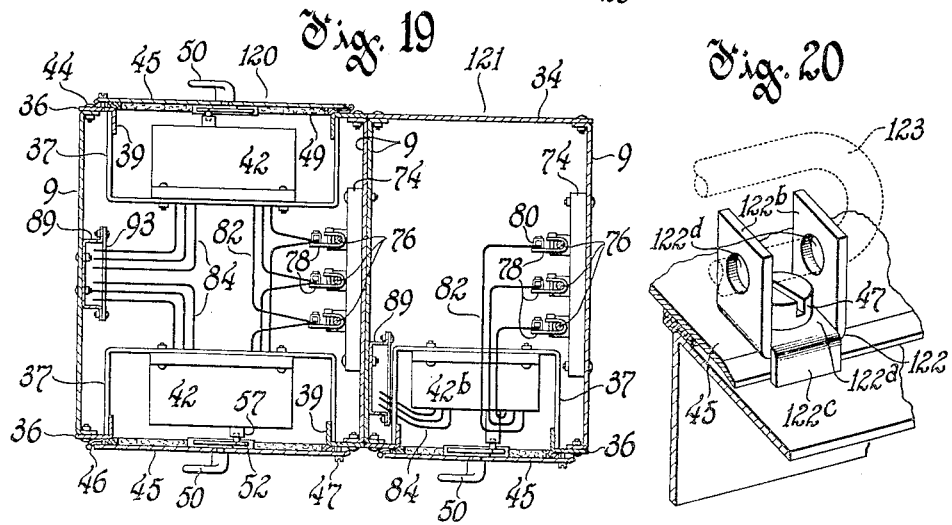

Patented May 18, 1943

2,319,415

UNITED STATES PATENT OFFICE 2,319,415

ELECTRICAL CONTROL APPARATUS

Edwin N. Lightfoot, Wauwatosa, Wis., assignor to Cutler-Hammer, Inc., Milwaukee, Wis., a corporation of Delaware Application October 2, 1940, Serial No. 359,421

23 Claims. (Cl. 175—309)

This invention relates to electrical control apparatus and more particularly to mounting means therefor.

In practice there are many control installations which occupy an excessive amount of space and often great difficulty is experienced in installing the necessary standard control apparatus in the limited space available therefor, whereas particularly in industrial plants it is highly important not only to avoid waste of space but in addition to plan for installation of additional control equipment as well as rearrangement of apparatus already installed. Also where standard or special apparatus is installed piecemeal much space is needlessly consumed by the wiring as well as by the mountings for the control apparatus. Also changes are difficult and costly.

The present invention has among its objects to provide mounting means for either standard or special control devices which will enable a large number of devices used for like or different purposes to be centralized with great saving in space, with great improvement in appearance of the installation, with better accessibility of the control device and the wiring thereof and with other distinct advantages.

Another object is to provide such a mounting of a construction which will be both reasonable in cost and exceedingly flexible so as to be readily adapted to meet both present and future needs.

Another object is to provide such a mounting affording substantially complete enclosure of each control device.

Another object is to provide a mounting which might be termed a sectionalized control center or alternatively a sectional switch or control panel or board and which may be formed wholly or in the main of a relatively few standard parts.

Another object is to provide such a mounting all parts of which are of simple construction preferably formed of sheet metal and capable of quantity production at low cost.

Various other objects and advantages of the invention will hereinafter appear.

The invention will now be described, particularly with reference to the embodiments thereof illustrated in the accompanying drawings, it being understood that the embodiments illustrated are susceptible of modification in respect of certain structural details thereof within the scope of the appended claims.

In the drawings, Figure 1 is a front elevational view on a reduced scale of a switch or control board or panel constructed in accordance with my invention.

Fig. 2 is a front elevational view of said board of Fig. 1 on a somewhat larger scale than that of Fig. 1 wherein certain of the sections are shown with the compartment assemblies omitted and wherein certain of the parts of said sections are omitted.

Fig. 3 is a view of the board of Fig. 1 looking into the sections from above, the top enclosing plates of the several sections being omitted.

Figs. 4 and 5 are vertical sectional views on a larger scale of one of the board sections, on the lines 4—4 and 5—5, respectively, of Fig. 3.

Fig. 6 is a vertical sectional view of one and of portions of the two adjoining board sections, on the line 6—6 of Fig. 3.

Figs. 7, 8, 9 and 10 are perspective views of certain of the different parts which may be used in forming each of the sections.

Figs. 11 and 12 are perspective views of two forms of wiring troughs which may be associated with the several sections.

Figs. 13 and 14 are plan views of the top and bottom end plates, respectively, of the board.

Fig. 15 is a perspective view of one size of door frame which is employed in the board and which is adapted to support a unit of electrical apparatus, for brevity hereinafter called control device.

Fig. 16 is a fragmentary perspective view illustrating the arrangement of the bus bars and bus rods by means of which the respective control devices contained in each of the board sections are adapted to be connected to a source of supply of electrical energy.

Fig. 17 is a perspective view of a portion of the board of Fig. 1 showing a typical compartment assembly and fragments of adjoining compartments, and illustrating the manner in which the door frame and electrical control device may be tilted outwardly for inspection or removed thereof.

Fig. 18 is a front elevational view of a board which embodies a different section and compartment arrangement from that shown in Fig. 1, certain of the parts at the right hand side of the figure being omitted for simplicity of illustration.

Fig. 19 is a horizontal sectional view of two adjoining sections, as viewed from above, illustrating a modification of the arrangement shown in Figs. 3 to 6, inclusive, and Fig. 20 illustrates a device enabling locking of the hinged door of a compartment assembly against unauthorized opening.

Referring first to Figs. 1, 2 and 3 of the drawings, there is shown a typical group of sections assembled in side by side relation to form a board 1. More specifically, said board is built up of a plurality of unitary sections 2 to 8, inclusive, of uniform height and depth and of a number of different standard widths to accommodate different sizes of control devices. Each of the sections 2 to 8 includes two upright supports or side plates 9 of identical form (Figs. 2 to 7).

The side plates 9 are preferably made of relatively heavy sheet metal and as best shown in Fig. 7 are of substantially rectangular form and are symmetrical about their longitudinal axis. The vertical edge portions of side plates 9 are each turned at a right angle in a like direction to form the relatively narrow flanges 10. Flanges 10 are provided throughout their full length with equally spaced punched or drilled openings 11 which, as will be more fully described, assist in assembly of the side plates 9 to form sections and in mounting the control devices in the respective sections. The upper and lower horizontal edges of side plates 9 are cut away intermediate the flanges 10 to form rectangular marginal notches 12 and to provide vertical projections 13 adjacent the flanges 10. The outer ends of projections 13 are each turned at a right angle to side plates 9 and in the same direction as flanges 10 to form short horizontal foot portions or flanges 14, each having a punched or drilled opening 15. Each side plate 9 is further preferably provided with a row of equally spaced openings 16 adjacent the horizontal edges of the marginal notches 12 and also with spaced openings 17 in each of the vertical projections 13.

As aforestated, two side plates 9 are employed in the construction of each section and as best shown in Figs. 2, 3 and 6 said side plates are so arranged that flanges 10 and 14 of the two side plates extend toward each other. The side plates 9 for each section are secured to each other and spaced apart a predetermined distance by means of a pair of lower cross members 18 and a pair of upper cross members 19. One of each pair of said cross members is secured to the side plates 9 at the front of the section and the other of each pair is secured to the side plates 9 at the rear of the section as by means of bolts 20 (Figs. 1, 2, 4, 5).

The lower cross member 18 is preferably made in the form illustrated in detail in Fig. 10 and comprises a flat rectangular plate of sheet metal, the height of which corresponds to the distance from the plane of flange 14 to a point midway between certain of the openings 11 above said plane. Member 18 is preferably made in a number of different predetermined standard lengths; say, 12, 14, 16, 18, 20, 24, 28 and 32 inch lengths, depending upon the number of standard section widths contemplated. Said member is provided adjacent each end thereof with a pair of openings 21 which are spaced to correspond with the spacing of openings 11 in side plates 9 to provide for securement of said member to said side plates, as hereinbefore described.

The upper member 19 is preferably formed as shown in Fig. 9 and comprises a flat rectangular plate of sheet metal having a horizontal flange 22 at its upper edge. As shown in Figs. 4 and 5 the inner surface of flange 22 is adapted to engage the outer surfaces of the respective flanges 14 of side plates 9 at the top of the section. Flange 22 is of such restricted width as to provide clearance for openings 15 in flanges 14 when said member 19 is engaging the outer surfaces of flanges 10. The lower edge of each member 19 also is midway of certain of the openings 11, and members 19 are made in standard lengths corresponding to the lengths of members 18 with which they are to be paired. Each member 19 is provided adjacent each end thereof with a pair of openings 23 spaced correspondingly to openings 11 in side plates 9 to provide for securement of said members to said side plates. The lower edge of member 19 has secured thereto, as by welding, a narrow overlapping plate 26, the ends of which are spaced from openings 23 by equal amounts substantially corresponding to the distances from openings 11 to the edges of the respective flanges 10, whereby the joints between each member 19 and the adjoining plates, hereinafter described, secured to side plates 9 are rendered substantially dust-tight.

Each section is adapted to be closed at the top by a rectangular top plate 24 (Fig. 8) which is preferably made in a number of predetermined standard lengths corresponding to those of members 18 and 19. Plate 24 is provided with corner openings 25 adapted for registry with openings 15 in flanges 14 of side plates 9. Bolts 27, penetrating said openings 25 and 15, secure plate 24 to said side plates. The opposite transverse edges of plate 24 are provided with vertically projecting flanges 28 which are respectively adapted to abut the flanges 28 of adjoining top plates. Said flanges are provided with openings 29 adapted to receive bolts 30 whereby said top plates are secured together with a substantially dust-tight joint therebetween. It will be noted from Figs. 4 and 5 that top plates 24 engage the upper surfaces of the flanges 22 of the front and rear upper cross members 19 to provide a substantially dust-tight joint therebetween.

As hereinbefore pointed out flanges 10 and 14 of each side plate project in the same direction, leaving the outer surface of each side plate plain. The flanges of the two side plates in each section extend toward each other, thus providing for assembly of adjoining sections in an abutting side by side relation, as shown in Figs. 3 and 6. Such adjoining sections are secured together by means of bolts 31 which penetrate the registering openings 17 in the contiguous side plates 9.

The board is preferably supported upon two rigid inverted channel members or bars 32 to insure proper alinement of the respective sections. Said members are arranged longitudinally of the board, one at the front, the other at the rear, and are disposed in supporting engagement with the lower flanges 14 of the several side plates 9. The sections comprising board 1 are secured to channel members 32 by means of bolts 33 which penetrate openings 15 in said lower flanges 14 and registering openings in said channel members.

The rear of each section is closed by means of one or more flat plates 34 which are provided with marginal openings spaced to register with certain of the openings 11 in flanges 10 to provide for securement of said plates to said flanges by means of bolts 35 (Figs. 3, 4 and 5). Plates 34 are also made in a number of predetermined standard widths (note 34$^a$, 34$^b$ and 34$^c$ in Fig. 3) corresponding to the lengths of the respective cross members 18 and 19 and of top plates 24. The lower edges of plates 34 are preferably provided with overlapping strips 26$^a$ (Figs. 4 and 5) similar to the strips 26 described in connection with cross member 19 to provide substantially dust-tight joints between abutting plates.

The control devices which are mounted in the respective sections of board 1 are preferably carried by door frames 36 (Figs. 15 and 17) which are adapted to be secured to the side plates 9 of said sections. Said door frames are of rectangular contour and are preferably of stamped sheet metal construction, each of the same having a pair of U-shaped brackets 37 secured thereto and extending rearwardly from the inner surface thereof. As shown in detail in Figs. 15 and 17, door frame 36 has the central portion thereof cut out to provide a rectangular door opening 38, integral portions of frame 36 being sheared at the upper and lower ends thereof and then bent or turned inwardly at right angles to said door frame to provide a pair of parallel vertical flanges 39. Brackets 37 are secured at predetermined spaced points to flanges 39 as by spot welding the ends of arms 37ª to said flanges, as shown in Fig. 15. One of said brackets is located adjacent the top and the other adjacent the bottom of door opening 38. The connecting portions 37ᵇ of said brackets are preferably provided with openings 37ᶜ whereby the panel or frame of a motor starter or other control device is adapted to be secured thereto, as by screws 40 in the manner indicated in Fig. 17. The control device 42 shown in Fig. 17 is a fused electromagnetically operated motor starter having associated therewith a manually operable disconnect switch and a resettable overload protective mechanism, and is illustrative of a typical mounting arrangement for the control devices which may be desired in a control center. The arrangement of mounting means in connection with door frame 36, may, of course, be modified from that shown in Figs. 15 and 17. In Figs. 2, 3 and 6, for example, the brackets 37ᵈ are shown as L-shaped. In Figs. 2, 3, 4, 5 and 6 the control devices are represented by the dotted line rectangles 42ª. The door frame 36 preferably has spot welded to its lower edge an overlapping strip 26ᵇ (Fig. 17), similar to strips 26 and 26ª hereinbefore mentioned. As shown in Fig. 17 strip 26ᵇ acts during tilting of said door frame to prevent outward displacement of the lower edge thereof while the outer ends of said lower edge engage the flanges 10 of frame 9, respectively, to prevent inward displacement thereof.

Door frame 36 is provided adjacent each corner with an opening 43, said openings being spaced to register with certain of the openings 11 in the flanges 10 of side plates 9 whereby said door frame is adapted to be secured to said side plates 9 as by means of bolts 44 (Fig. 17).

The opening 38 in door frame 36 is adapted to be closed by a door 45 which is hinged at one side of said opening to said frame, as best shown at 46 in Fig. 17. Door 45 is preferably secured in the closed position by means of screws 47 which cooperate with threaded openings 48 in the door frame. Glued or otherwise fastened to the inner surface of door 45 and adjacent the edges thereof are strips 49 of a resilient material, such as felt, which is compressed between said door and frame 36 upon tightening of screws 47 to provide a substantially dust-tight closure.

Where manually operable or push-button controlled apparatus is employed, suitable means are preferably associated with the compartment doors to effect operation of such apparatus, without opening of the doors except for repair or replacement of parts. A device for effecting manual operation of the disconnect switch of starter 42 is shown in connection with door 45 (Fig. 17) and comprises essentially an external operating handle 50 (shown on door 45ª, Fig. 17) having associated bearing parts journaled in said door and a lever 52 which is arranged upon the inner face of door 45. Said lever comprises a rectangular plate which is rigidly secured intermediate its ends to handle 50 as by a screw 53 for movement with said handle. Lever 52 cooperates with a stop member 54 secured to the inner face of said door to limit operation of said lever and handle 50 in opposite directions. An inwardly projecting pin 55 secured adjacent one end of lever 52 is adapted to cooperate with a channeled portion 56 formed on the outwardly projecting end of the disconnect switch operating lever 57 whereby to effect operation of said switch to open circuit and closed circuit positions, respectively, upon movement of handle 50 in opposite directions.

The doors 45ᵇ, shown in Figs. 1 and 2, are provided with extension push-buttons 58 which are adapted to cooperate with push-buttons associated with control devices enclosed within said doors, such, for example, as the reset push-button 59 of starter 42 (Fig. 17). However, as indicated in Fig. 17 it is sometimes preferred that access to the reset push button requires opening of the door, in which case the extension push-button is omitted.

For further enclosure of board 1 the marginal notches 12 in those side plates 9 at opposite ends of the assembly are covered by upper end members 60 and lower end members 61, shown in detail in Figs. 13 and 14, respectively. Said members comprise flat rectangular plates of sheet metal of a length corresponding substantially to the width of side plates 9. Each is provided with three relatively large knockouts 63 which are adapted for accommodation of conduits such as those shown at 64 in Figs. 1 and 16. Said members are further provided adjacent each end thereof with pairs of openings 65 adapted for registry with certain of the openings 17 of side plates 9 whereby said members are adapted to be secured to said side plates by means of cooperating bolts 66. Upper end member 60 is somewhat wider than member 61, having a portion for engaging flange 28 on top plate 24, said portion being provided with openings 67 adapted for registry with openings 29 in flange 28 whereby said member 60 is secured to said flange by means of bolts 30.

Figs. 3, 4, 6 and 16 best show a preferred arrangement for connecting the control devices to a source of supply. As will be apparent Fig. 16 shows fragments of the upper portions of two vertical sections at one end of the assembly. Insulated conductors 68 are brought in conduits 64 to and through the upper end plate 60, whence they are brought across the upper part of the first vertical section and their bared ends secured by suitable clamps 69. Said clamps together with the ends of the horizontal bus bars 70 are secured by means of screws 73 to support blocks 72 which in turn are carried by an insulating board 74 and secured thereto by screws 75 (Fig. 5). Board 74 may be carried by contiguous side plates 9 as shown in Fig. 16 or by a single side plate, such as that of section 8 (Fig. 3). The upper edge portions of boards 74 are extended into the upper marginal notches 12 of side plates 9 as shown in Figs. 4 and 5, thus providing for extension of bus bars 70 through as many of the sections as required, by way of the passage formed by said notches, adequate electrical clearance also being thus provided between said bus bars and adjacent section parts.

To facilitate connection of a plurality of control devices in individual vertical sections to bus bars 70 it is preferred to provide the individual sections with vertical bus rods 76 which are connected to the respective bus bars as by threading into the support blocks 72. Insulating boards 74ª are mounted in a similar manner to insulating boards 74, but adjacent the lower ends of side plates 9. Secured to board 74ª as shown in Figs. 4 and 6 are spaced lugs 77 which are adapted to receive the lower ends respectively, of vertical bus rods 76 whereby the same are firmly held in a given spaced relation.

A suitable form of removable connector lug comprising a U-shaped clip 78 is adapted for intimate engagement with bus rods 76 upon tightening of screw 79. One leg of each clip is appreciably longer than the other and is provided adjacent its free end with a wire clamp 80 of suitable form to receive and grip the end of a wire lead such as those indicated at 82 in Figs. 4 and 6. The other ends of leads 82 are connected to terminals 83 associated with the respective control device (Fig. 6).

It is to be understood that the arrangement of bus bars and bus rods hereinbefore described may be modified to suit various installation conditions. For example, conductors 68 may be brought within the assembly through one of the lower end plates 61 or through the floor beneath the assembly to be connected to bus bars 70 extending across the sections through the lower marginal notches 12. The insulating boards 74 would then be mounted adjacent the bottom of side plate 9 and boards 74ª adjacent the top of said side plates. The lower ends of bus rods 76 would be threaded into blocks 72 and the upper ends thereof held in lugs 77. Also, bus rods 76 are dispensed with in some instances, their function being served by lead wires extending directly from terminals 83 to bus bars 70, to which they may be secured as by screws threaded into said bus bars.

The load terminals 85 of a control device may be connected to a translating device to be controlled by means of lead wires 84 to a suitable terminal board 86 and thence by lead wires 84ª to said translating device, such as a motor. Lead wires 84ª are shown as being passed into a conduit 87 let through the floor beneath the assembly, it being apparent that other arrangements may be employed such as passing the load leads 84ª upwardly and out of the assembly through one of the top plates of the assembly. Terminal boards 86 are carried upon flanges 88 of a vertically arranged wiring trough 89 and are secured thereto by means of screws 90. As shown in Figs. 5 and 6 conductors 84ª are arranged within the wiring trough 89 and behind certain of the terminal boards 86. As best shown in Figs. 5 and 11 flanges 88 of wiring trough 89 are provided throughout their length with openings 92 whereby to provide for securement thereto of terminal boards 86 or of wire retaining straps 93. The latter are employed when the load conductors 84 are passed directly from terminals 85 to the outside of the assembly, as to conduit 87. Thus a strap 93 is located approximately in horizontal alinement with the load terminals 85 associated with each control device in a section, the load conductors are arranged within wiring trough 89, the proper conductors for each control device being brought out of the wiring trough horizontally and being passed either over or under the respective strap 93, depending upon whether the conductors are brought in from the top or the bottom of the section. The ends of said conductors are connected to terminals 85.

The back of trough 89 is provided adjacent the upper and lower ends thereof with a number of relatively closely spaced openings 94 which are adapted for registry with the openings 16 in side plate 9 whereby said trough is adapted to be secured to a side plate 9 as by screws 95, which in this case also assist in securing insulating boards 74 and 74ª. The close spacing of openings 94 provides for mounting wiring trough 89 in a relatively large number of different positions as compared to the number of openings 16 in side plate 9.

Fig. 12 shows in detail a form of horizontal wring trough 96 which is preferably employed to carry control circuit conductors (not shown) from one section to others in the assembly. Said trough is provided with downwardly extending vertical flanges 97 at opposite ends thereof, each of which has a pair of openings 98 spaced to correspond with the spacing of openings 16 in side plate 9, by means of which and cooperating bolts 99 trough 96 is secured to bridge the respective section in the manner best shown in Figs. 4 to 6. Wiring troughs similar to item 96 are made in various standard widths, corresponding to the standard section widths. The bottom of trough 96 is provided with a number of knockouts 100 for the accommodation of the control circuit conductors, either open or in conduits, which are associated with the control devices.

Means are preferably provided to protect against arcing from any control device to the one above it. Such means may take the form of a plate of thin sheet metal 101 suspended in any suitable manner at its edges horizontally across the section and between control devices, as shown in Fig. 4. Portions of barrier 101 are cut away to provide adequate mechanical and electrical clearance for the bus rods 76 and the wiring trough 89.

A preferred form of barrier 102 is shown in Fig. 15 and comprises a flat plate of sheet metal mounted, as shown, adjacent the upper end of door frame 36. Barrier 102 has a vertical flange 102ª which is fixed against the inner surface of said door frame as by spot welding.

Referring to Fig. 18, an assembly 103 is shown having a compartment and section arrangement differing from that shown in Figs. 1 to 3. Assembly 103 comprises four sections 104 to 107, each of which is built up in a manner similar to those hereinbefore described, including two side plates 9, lower and upper cross members 18 and 19, respectively, and a top plate 24. Other parts thereof which are identical with those aforedescribed are similarly identified.

Considering section 104, the upper half thereof comprises a compartment 108 which extends across the full width of said section. Compartment 108 contains a control device closed in front by a door frame and door similar to items 36 and 45, respectively, of Figs. 15 and 17. The lower half of section 104 comprises compartment 109 which may either be vacant or occupied by apparatus, such as resistors or automatic apparatus requiring infrequent attention and therefore is preferably closed in front by a plate 34ᵈ similar to the back plates 34, hereinbefore described.

The upper third of section 105 comprises a full width compartment 110 closed in front by a door. The left hand half of the lower two-thirds of section 105 comprises two compartments 111 of one-half the width of said section and each approximately one-fourth the height of said section, said compartments being closed in front by doors, the remaining space 112 being covered by a plate. The right hand half of the lower two-thirds of section 105 comprises two compartments 113 of one-half the width of said section and each approximately one-third the height of said section, said compartments being closed in front by doors.

Sections 106 and 107 are of greater width than sections 104 and 105, the latter being represented as sections of 24 inch width and the former as sections of 28 inch width. The upper half of section 106 comprises a full width compartment 114 closed in front by a door. The left hand lower quarter of section 106 comprises two compartments 115 of one-half the width of said section and one-fourth the height thereof. The right hand lower quarter of section 106 comprises a compartment 116 of one-half the width of said section and one-half the height thereof.

Section 107 has omitted therefrom its front closures, such as doors and door frames or plates and is shown without apparatus for purposes of illustration. The arrangement shown in connection with section 107 is that preferred for forming such half-width compartments as indicated at 111, 112, 113, 115 and 116. Cross members 117, secured at their opposite ends to flanges 10 of side plates 9 and vertical members 118, secured at their ends to members 117, form the framework upon which the door frames of said compartments are mounted.

Fig. 19 shows two sections 120 and 121 mounted in side by side relation. Section 120 embodies an arrangement wherein control devices are mounted in back to back relation in the same section. Thus a door frame 36 with its associated door 45 and carrying a control device such as 42 in the manner hereinbefore described is shown mounted in the front of section 120 and also a like assembly in the rear thereof. Further description of the foregoing arrangement is thought to be unnecessary, inasmuch as the parts thereof are hereinbefore described and are identified in Fig. 19 by like reference numerals.

Section 121 shows an arrangement providing for front wiring of such control devices as are built therefor. A unit 42$^b$ is provided with wiring terminals (not shown) on the front face thereof. The line leads 82 are brought from the connector lugs 78 associated with bus rods 76 and may be passed either over, under or around the unit 42$^b$ to be connected to the line wiring terminals. The load leads 84 are brought from the vertical wiring trough 89 and may be passed between the brackets 37 (best shown in Figs. 15 and 17) to be connected to the load wiring terminals. The vertical wiring trough 89 is preferably located well toward the front of the section, as shown, for front wiring of the devices.

Fig. 20 shows a device for use in connection with the screws 47 associated with doors 45 to provide against unauthorized opening of said doors. Said device comprises a substantially U-shaped element 122 formed of sheet metal, having a base portion 122$^a$ and a pair of outwardly extending parallel arms 122$^b$. Base portion 122$^a$ is provided with an opening (not shown) to accommodate the shank of screw 47, said base portion being clamped between the front face of door 45 and the head of screw 47 upon tightening of the latter. An inwardly extending lug 122$^c$ is adapted to engage the edge of door 45 to restrain the element 122 against rotary displacement. The outwardly extending arms 122$^b$ are provided with alined openings 122$^d$ adapted to receive the hasp 123 (shown in dotted lines) of a padlock, said openings being so arranged that hasp 123 overlies the head of screw 47 to prevent withdrawal of said screw and thus to prevent unauthorized opening of door 45.

It will be apparent from the foregoing description and the accompanying drawings that the present invention provides for compact and centralized mounting of large numbers of standard or special control devices of different sizes used for like or different purposes within a sectional panel assembly. The panel assembly provides, in effect, a single substantially complete enclosure for all of the control devices and of the wiring therefor, thus effecting great saving in space over separately enclosed devices mounted in piecemeal or scattered fashion. The standardized construction affords quick and convenient assembly of any panel assembly to meet present requirements, while future changes due to expansion, shop layout changes, etc., may quickly and easily be taken care of by adding or rearranging sections, or by replacing control devices. As will be apparent any panel may easily be completely disassembled for use of its parts in a new assembly.

Individual control devices may be removed from and mounted in the sections without disturbing or interrupting the power or load connections to any other of the devices in the panel by removing the appropriate back plate 34 and disconnecting the power and load leads 82 and 84, respectively, from the lugs 78 and terminal board 86, respectively, and then detaching the door frame from the front of the section. Alternatively the wiring for the control devices may be made accessible from the front of the panel upon removal of such devices.

What I claim as new and desire to secure by Letters Patent is:

1. In apparatus of the character described, in combination, parallel vertical supports spaced for attachment thereto of a door frame of given dimensions, cross members secured to said supports and an intermediate vertical support secured to said cross members, the intermediate support with the first mentioned supports affording mounting for two door frames in a parallel relation, door frames detachably fixed to said supports, an electrical control device wholly supported by and behind each of said door frames and a door supported by each of said door frames.

2. In apparatus of the character described, in combination, parallel supports comprising sheet metal walls having inwardly turned front and back edges, an electrical control device to be mounted between said supports, a door frame to which said device is fixed for support thereby, said door frame being attachable to the inturned front or back edges of said supports, means inherently affording securement of said door frame to said supports in substantially any position longitudinally of said supports, and a door supported by said door frame, said supports throughout the extent of said door frame longitudinally of said supports being concealed by said door frame.

3. In apparatus of the character described, in combination, parallel supports comprising sheet metal walls having inwardly turned front edges, an electrical control device to be mounted between said supports, a door frame to which said device is fixed for support thereby, said door frame being attachable to the inturned edges of said supports, means inherently affording securement of said door frame to said supports in substantially any position longitudinally of said supports, and a door supported by said door frame, said supports throughout the extent of said door frame longitudinally of said supports being concealed by said door frame, and said door frame having an offset edge to underlie the adjacent edge of another door frame or other member fixed to said supports.

4. In apparatus of the character described, in combination, a plurality of electrical control devices of exposed panel type, vertical parallel supports between which said control devices are to be mounted, said supports comprising sheet metal walls having their front edges turned inwardly in the same plane, front plates fixed to said supports at the extremities thereof, said side walls having openings therein behind said front plates for wiring purposes, and door frames overlying and fixed to said inturned edges of said supports, each of said door frames having fixed thereto for support thereby one of said control devices with its panel facing the opening of the door frames, and each of said door frames having mounted thereon a door, the means for fixing said door frames to said supports inherently providing for securement of door frames differing in dimensions longitudinally of said supports and inherently providing for securement of the door frames in different relations contiguously to one another and with at least one of said door frames contiguous to one of said front plates.

5. In apparatus of the character described, in combination, a panel assembly comprising sections having the same longitudinal dimension, each section comprising vertical parallel sheet metal side walls with side openings for wiring purposes and with inturned front edges and the adjacent walls of adjacent sections being secured together, a plurality of electric control devices of panel type to be supported within said sections, said sections having detachably fixed to the inturned edges of the side walls thereof door frames and each of said control devices being fixed to one of said door frames at the rear thereof with its panel facing the opening of the door frame and a door mounted on each of said door frames, the construction inherently providing for use and securement of door frames having the same or different dimensions longitudinally of the sections.

6. In apparatus of the character described, in combination, a panel assembly comprising sections having the same longitudinal dimension, each section comprising parallel sheet metal side walls with inturned front edges and the adjacent walls of adjacent sections being secured together, a plurality of electric control devices to be supported within said sections, said sections having detachably fixed to the inturned edges of the side walls thereof door frames and each of said control devices being fixed to one of said door frames at the rear thereof, and a door mounted on each of said door frames, the construction inherently providing for use of door frames having the same or different dimensions longitudinally of the sections, each of said door frames having an offset edge to underlie the adjacent edge of the next adjacent door frame.

7. In apparatus of the character described, the combination with a sectional panel assembly each section whereof comprises vertical side walls of a standard length and front plates of any one of a number of standard lengths fixed to the side walls adjacent the extremities thereof and correspondingly spacing the side walls, the sections of said panel being stacked side by side and having registering side wall openings behind said front plates for wiring purposes, of a plurality of door frames each detachably secured to one of said panel sections to constitute a front therefor, a plurality of electrical control devices each fixed to one of said door frames at the rear thereof to be supported thereby within one of said panel sections and a door carried by each of said door frames, the construction of the panel assembly and of the securing means for the door frames inherently permitting use of door frames which are alike or unlike in dimension longitudinally of the panel sections whereby such dimension of the door frames may be varied with the corresponding dimension of the control device carried thereby.

8. In apparatus of the character described, in combination, a sectional panel assembly, each section comprising a pair of vertical side walls of a standard length and connecting members for said side walls, which connecting members may be of any one of a number of lengths to space said side walls correspondingly, the sections being provided with side openings therein behind said connecting members and being stacked in a side by side relation and the front edges of their respective side walls being inturned to lie in the same plane, of one or more door frames for each of said sections to constitute a front therefor, said inturned edges of the side walls of said sections being formed to receive at a series of points securing means for said door frame to enable employment of door frames of varying dimensions longitudinally of each section and to enable selection of different positions of the individual door frames longitudinally of its panel section, a plurality of panel type electrical control devices for enclosure within said panel sections, each of said control devices being fixed to the rear side of one of said door frames in a parallel relation thereto, and a door for each control device mounted on its respective door frame.

9. In apparatus of the character described, the combination with a sectional panel assembly, each section comprising a pair of vertical side walls of standard length and connecting members for said side walls, which connecting members may be of any one of a number of lengths to space said side walls correspondingly, the sections being secured together in a side by side relation and the front edges of their respective side walls being inturned to lie in the same plane, of at least one door frame for each of said sections constituting a front therefor, said inturned edges of the side walls of each of said sections being formed to receive at a series of points door frame securing means to enable employment of door frames of a non-uniform dimension longitudinally of the sections and to enable selection of different positions of the individual door frame longitudinally of its panel section, a plurality of electrical control devices for enclosure within said panel sections, each of said control devices being fixed to the rear side of one of said door frames, and a door for each control device mounted on its respective door frame, certain of said door frames being of less width than the respective panel section and the latter being provided with a vertical support for such door frame suitably located intermediate the side walls of such section.

10. In apparatus of the character described, the combination with an all sheet metal panel section comprising parallel side walls having edges turned inwardly and further comprising a top wall, a front wall and a back wall, attached to the inturned edges of said side walls, one of said attached walls comprising at least in part a plurality of readily detachable door frames equipped with doors, of a plurality of electric control devices each fixed to one of said door frames at the rear thereof for support thereby and side wall devices for supporting within the panel section line and load connections for the enclosed control devices.

11. In apparatus of the character described, an all sheet metal panel section comprising parallel side walls having inturned edges, the corresponding inturned edges of said walls to occupy the same plane, a top wall and front and back walls bolted to the inturned edges of said side walls, said front and back walls comprising oppositely disposed door frames, each equipped with means to support an electrical control device behind the same and with a door to conceal such device, the inturned edges of said side walls to which said door frames are attached having an excess number of bolt holes arranged to enable bolting to said side walls, door frames varying in dimension longitudinally of said side walls.

12. In apparatus of the character described, an all sheet-metal panel section of a standard length for vertical mounting comprising vertical side walls having inturned edges, the corresponding inturned edges of said walls to occupy the same plane, a top wall and front and back walls bolted to the inturned edges of said side walls and affording the section any one of a number of standard widths, said front wall comprising a plurality of separately attachable and detachable door frames, each equipped with means to support behind it a control device, with a door to conceal said device and with an offset lower transverse edge to underlie the upper edge of the next adjacent part of the front wall.

13. In apparatus of the character described, an all sheet-metal panel section of a standard length for vertical mounting comprising vertical side walls having inturned edges, the corresponding inturned edges of said walls to occupy the same plane, a top wall and front and back walls bolted to the inturned edges of said side walls and affording the section any one of a number of standard widths, said front wall comprising a plurality of separately attachable and detachable door frames, each equipped with means to support behind it a control device, with a rearwardly extending horizontal plate to overlie such device and with a door to conceal such device.

14. In apparatus of the character described, an all sheet-metal sectional panel assembly, each section comprising vertical side walls of uniform shape and dimensions, each having end portions cut away to receive bus bars and having inturned edges, the side walls for adjacent sections being secured together in alinement and each section further comprising top, front and rear walls bolted to the inturned edges of the side walls, the composite front wall of the panel assembly comprising a plurality of door frames separately attachable to and detachable from said side walls, each of said door frames having on its outside a door and on its inside means for wholly supporting an electrical control device fitting into the respective section.

15. In apparatus of the character described, a pair of rigid horizontal and parallel supporting bars, an all sheet-metal sectional panel assembly supported by said bars, each section of said panel assembly comprising vertical side walls of uniform shape and dimensions, each of said side walls having end portions cut away to accommodate bus bars and having inturned edges certain of which are bolted to said supporting bars, each section of said panel assembly further comprising top, front and back walls bolted to inturned edges of the side walls of the respective section, the sections being mounted in a contiguous relation and in alinement on said supporting bars, the composite front wall of the panel assembly comprising a plurality of door frames separately attachable to and detachable from the side walls of their respective sections, each of said door frames having on its outside a door and on its inside means for wholly supporting an electrical control device fitting into the respective section.

16. In apparatus of the character described, a pair of rigid horizontal and parallel supporting bars, an all sheet-metal sectional panel assembly supported by said bars, each section of said panel assembly comprising vertical side walls of uniform shape and dimensions, each of said side walls having end portions cut away to accommodate bus bars and having inturned edges certain of which are bolted to said supporting bars, each section of said panel assembly further comprising top, front and back walls bolted to inturned edges of the side walls of the respective section, the sections being mounted in a contiguous relation and in alinement on said supporting bars, the composite front wall of the panel comprising matching plates along the top and bottom edges thereof and intermediate of said plates with a plurality of separately attachable and detachable door frames each having on its outside a door and on its inside means for wholly supporting an electrical control device fitting into the respective section of the panel, the aforedefined construction accommodating in each section a number of door frames of like or different height and accommodating door frames of like or different width in adjacent sections.

17. In apparatus of the character described, an all sheet metal panel section comprising vertical parallel side walls having cut away portions for accommodation of bus bars and having inturned edges, the corresponding inturned edges to occupy the same plane, a top wall and front and back walls secured to the inturned edges of said side walls, the front wall comprising removable sections secured one above another to the inturned edges of said side walls and each having means for attachment thereto of a control device, said side walls affording said panel section a depth to accommodate control devices varying substantially in corresponding dimensions while affording space at the rear of the section for wiring, free access to which wiring space throughout the length of the section may be had with the back wall removed.

18. In apparatus of the character described, a standard side wall member to be used in duplicate for each panel section and comprising an oblong sheet metal plate having at opposite ends cutouts to accommodate bus bars and having inturned edges at its extremities and throughout its length, all of said inturned edges projecting from the same side of said plate and the opposite side of said plate being flat, said plate having bolt holes for securement thereto of another like plate, and top, front and back walls, the bolt holes for securement of such walls being located in its inturned edges and the holes for attachment of the front wall being multiplied whereby the front wall may be attached in sections alike or unlike in dimension longitudinally of said plate.

19. In apparatus of the character described, the combination with a plurality of electrical control units of exposed panel type, of an enclosure for said units of self-supporting type comprising parallel side walls and a sectional wall connecting said side walls, certain sections of the latter wall comprising door frames each having fixed thereto at the rear thereof one of said units with its panel facing the opening of the door frame and each door frame having thereon a door, said side walls being spaced to accommodate said control units for insertion and removal of the latter freely while fixed to their respective door frames and said door frames having means for attachment to said enclosure thereby to afford full support for their respective control units and being readily attachable and detachable individually for mounting and removal of their respective control units.

20. In apparatus of the character described, the combination with a plurality of electrical control units of exposed panel type, of an enclosure for said units comprising four connected vertical walls arranged at right angles one to another, at least one of said walls being divided horizontally into sections, certain of said sections comprising door frames having securing means enabling attachment thereof interchangeably even though said door frames differ in height and the space within the enclosure being unobstructed throughout the combined heights of the interchangeable door frames, each door frame having at the rear thereof means to support one of said control units with its panel facing the opening of the door frame and each door frame having thereon a door, the spacing of the side walls of said enclosure being sufficient to accommodate said control units for insertion and removal thereof freely while fixed to their respective door frames and said door frames through attachment to the enclosure affording full support of their respective control units and being readily detachable individually for removal of their respective control units.

21. In apparatus of the character described, the combination with a plurality of electrical control units of exposed panel type, of an enclosing structure for said control units comprising parallel side walls and parallel connecting walls, the latter walls being at least in part removable and at least one of the same comprising readily attachable and detachable door frames each having fixed thereto at the rear thereof one of said control units with its panel facing the opening of the door frame and each door frame having thereon a door, said side walls being spaced to accommodate said control units for insertion and removal thereof freely while fixed to their respective door frames, and side wall devices for supporting within said enclosing structure line and load connections for all of the enclosed control units.

22. In apparatus of the character set forth, the combination with a plurality of electrical control units of exposed panel type, of an enclosure for said units comprising parallel side walls spaced to receive freely therebetween in a transverse relation thereto the panels of said units, parallel walls connecting said side walls and comprising door frames each having fixed thereto at the rear thereof one of said control units with its panel facing the opening of the door frame and each door frame having thereon a door, said connecting walls having spacing such as to afford accommodation by said enclosure of control units fixed to door frames in opposed walls of the enclosure and said door frames having means for attachment to the enclosure whereby they afford adequate full support for their respective units and whereby they are rendered readily detachable individually for removal of their respective control units.

23. In electrical control apparatus, the combination with a self-contained electrical control device of the panel type to be supported within an enclosure having a receiving opening of dimensions greater than the maximum dimensions of the panel of said control device, and to be supported with clearance of all parts thereof from the enclosure, of a door frame to close the receiving opening of the enclosure and to be secured to the enclosure, said door frame having means to support said control device with the panel of the latter facing the opening of the door frame and having a door to conceal said control device, the control device being supported in a relation to said door frame such that it is insertable into and removable from the enclosure while fixed to said door frame and being wholly supported within the enclosure through the medium of said door frame and its connection to the enclosure.

EDWIN N. LIGHTFOOT.